United States Patent [19]

Maguire

[11] 3,881,832

[45] May 6, 1975

[54] LOW PROFILE PROTECTIVE INSERT FOR SEWERS

[76] Inventor: Harry A. Maguire, 37343 Carleen Ave., Avon, Ohio 44011

[22] Filed: May 16, 1974

[21] Appl. No.: 470,389

[52] U.S. Cl. .......................... 404/4; 404/2; 210/164
[51] Int. Cl. ............................................ E01c 11/22
[58] Field of Search ..................... 404/2, 4; 210/164

[56] References Cited
UNITED STATES PATENTS

| | | | |
|---|---|---|---|
| 1,561,120 | 11/1925 | Smith | 210/164 |
| 3,529,391 | 9/1970 | Laethem | 210/164 |
| 3,587,416 | 6/1971 | Flanagan | 404/9 |
| 3,666,104 | 5/1972 | Aprill, Jr. et al. | 210/164 |

Primary Examiner—Mervin Stein
Assistant Examiner—Steven Hawkins
Attorney, Agent, or Firm—Donnelly, Maky, Renner & Otto

[57] ABSTRACT

An overlying protective insert for connection to sewer gratings covering storm sewer openings or the like includes a number of cross members positioned transverse to the parallel grating openings for precluding the wedging in such openings of narrow tires, wheels or the like. The insert exhibits a low profile, is securely attached to the grating, and may include a member to prevent interference with snow plows or the like.

14 Claims, 3 Drawing Figures

PATENTED MAY 6 1975 3,881,832

LOW PROFILE PROTECTIVE INSERT FOR SEWERS

BACKGROUND OF THE INVENTION

This invention relates to a protective insert for sewers, and more particularly relates to a low profile insert to prevent foreign objects from wedging in the longitudinal openings in a sewer grating.

Openings to conventional storm sewers used to drain water from a road or sidewalk surface or the like are normally covered by a heavy steel drop-in sewer grating. The grating usually includes a number of parallel longitudinal openings through which water and small particles of debris may pass into the storm sewer, such openings being separated by parallel interstitial wall dividers of adequate size and strength to support safely a motor vehicle wheel or the like. While conventional sewer gratings provide the aforementioned functions, the longitudinal openings are a safety hazard to bicycle tires, baby carriages or other devices having relatively narrow wheels, or the like, which too often fall into those openings causing inconvenience, damage and/or injury.

Thus, it is desirable to provide some protection at the sewer grating to prevent occurrence of such inconveniences, damage, and injuries. One prior art device intended to afford such protection uses several relatively large diameter rods, which rest on the sewer grating wall dividers in a position perpendicular the longitudinal grating openings, and a pair of longitudinal bars having a number of holes through which the respective rods are inserted for retention over the sewer grating. The longitudinal bars thus extend both above and below the plane defined by the upper edges of the wall dividers, and, therefore, such device exhibits a relatively high profile. A bolt and nut arrangement is used to attach the insert to the sewer grating. Such prior art device suffers from several disadvantages including the relatively high profile above the sewer grating resulting in a safety hazard, which may cause damage to bicycle or motor vehicle tires and injury to pedestrians. Moreover, the bolt and nut fastening arrangement permits removal by vandals, and the relatively high profile subjects the insert to destruction by snow plows, street cleaning equipment, or the like. Moreover, with regard to snow plows, the high profile of the prior art device may cause the plow to permit a snow barrier to accumulate about the storm sewer opening, whereby water flow thereto is restricted and dangerous ice accumulations may occur.

SUMMARY OF THE INVENTION

The instant invention provides a low profile insert for the above-mentioned protection functions at sewer gratings while avoiding the disadvantages of the prior art. Moreover, the insert of the invention includes means for firmly attaching the insert to the grating and, if desired, a guard to avoid interference with snow plows or the like.

Accordingly, a primary object of the invention is to provide a protective insert for sewers to prevent bicycle tires or other relatively narrow wheels or objects from falling into the longitudinal openings of a conventional sewer grating. Additional objects of the invention include the provision of such a protective insert having a low profile and means for securely fastening the device to the sewer grating while avoiding interference with snow plows, street cleaning equipment, or the like.

A further object of this invention is to fasten securely a protective sewer insert to the sewer grating.

Another object of the invention is to protect sewer inserts from interference with snow plows while permitting proper operation of both the snow plow, the insert, and the sewer.

Still a further object of the invention is to provide safety features for a sewer grating to preclude bicycle tires, or other small wheels or objects from becoming lodged in the openings thereof.

These and other objects and advantages of the present invention will become apparent as the following description proceeds.

To the accomplishment of the foregoing and related ends, the invention, then, comprises the features hereinafter fully described in the specification and particularly pointed out in the claims, the following description and the annexed drawing setting forth in detail a certain illustrative embodiment of the invention, this being indicative, however, of but one of the various ways in which the principles of the invention may be employed.

DESCRIPTION OF THE PREFERRED EMBODIMENT

Figure 1:
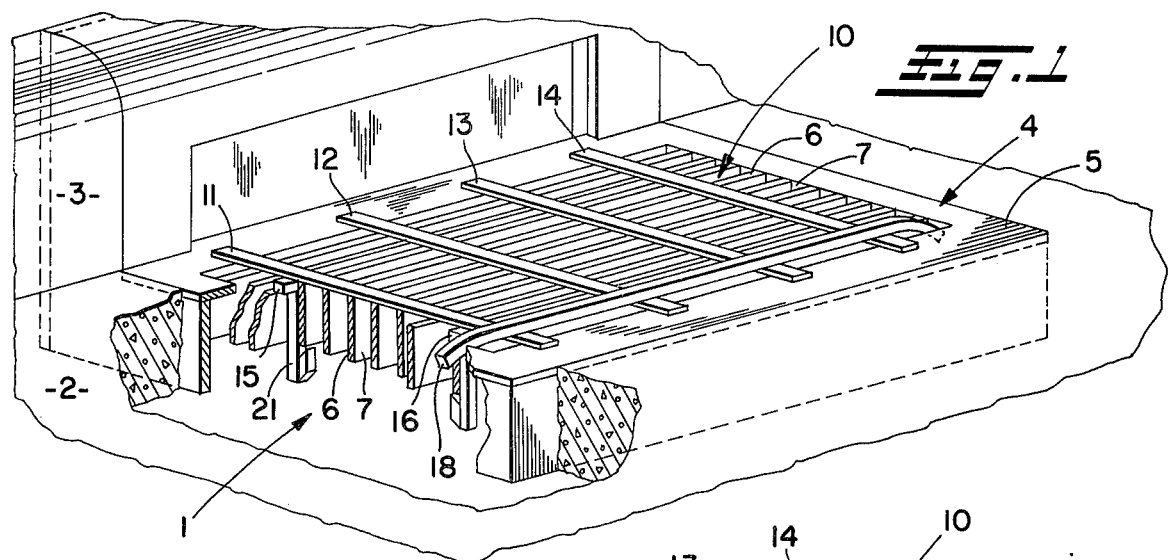
FIG. 1 is an environmental view showing a protective insert in accordance with the invention positioned in a sewer grating.

Referring now particularly to the drawing, wherein like reference numerals refer to like elements in the several figures, a storm sewer drain opening 1 is illustrated in FIG. 1 opening to the surface of the street 2 adjacent a curb 3. The storm sewer drain opening is covered by a conventional drop-in sewer grating 4, which has a rectangular perimeter 5 and a plurality of interstitial wall dividers 6 between which longitudinal openings 7 are defined extending generally in parallel with the curb 3. Each wall divider has upper and lower edges, and all of the former usually terminate in a common plane approximately parallel or slightly below the plane of the street.

A protective insert 10 in accordance with the invention includes a number of substantially parallel and coplanar cross members 11 through 14 positioned in overlying and transverse relationship to the interstitial wall dividers 6 for support thereby. A pair of longitudinal connecting members 15, 16 are welded to the bottom of each cross member proximate respective opposed ends of the latter. The actual location of each longitudinal connecting member will depend on the spacing of the longitudinal openings 7 of the sewer grating 4 on which the protective insert 10 is to be used in order that the longitudinal connecting members may fall entirely within respective longitudinal openings beneath the plane defined by the upper edges of the respective interstitial wall dividers 6.

In one model of the invention it was found that steel stock material having a three-sixteenth inch thickness and one inch width was satisfactory for the cross members 11 through 14 and one-half inch square cross-section steel stock material was satisfactory for the longitudinal connecting members 15, 16. Thus, a protective insert 10 in accordance with the invention exhibits a relatively low profile over the major extent thereof, whereby only the relatively thin cross members 11 through 14 extend above the plane defined by the upper edges of the interstitial wall dividers 6. Therefore, the small thickness dimension of the cross member precludes damage to vehicle tires and is unlikely to present an impediment to pedestrians. Moreover, the spacing between respective cross members and the total number thereof may be varied depending on the sewer grating size so as to prevent bicycle or other wheels from becoming wedged in the longitudinal openings 7 of the sewer grating 4 while still permitting free passage of water and small particles of debris to pass into the sewer drain opening 1. Also, since the spacing between respective interstitial wall dividers 6 is normally sufficiently small relative to the width of an automobile or other vehicle tire, the weight of such vehicle is actually supported by the wall dividers and not by the cross member, thus permitting the latter to be relatively thin.

A further longitudinal member 17, for example made of steel stock, may be positioned transverse to the respective cross members 11 through 14 and welded thereto. However, the opposed ends 18, 19 of such further longitudinal member are deformed in a downward direction so as to terminate at respective locations beneath the plane defined by the upper edges of the wall dividers 6. Such further longitudinal member 17 prevents interference between the protective insert 10 and snow plows which are not equipped with protective bottom wiper pads. Thus, such a snow plow would ride smoothly over the further longitudinal member without contacting the respective cross members 11 through 14 while still being capable of effecting an adequate plowing function.

The thickness of the further longitudinal member 17 is preferably as small as possible to maintain the low profile of the overall protective insert 10, and such member 17 may be attached to the cross members 11 through 14 so as to overlie one of the longitudinal openings 7, although the location thereof proximate the ends of the cross members remote from the curb 3 may be desired to assure full interference prevention. Moreover, if desired, the longitudinal connecting member 16 may be eliminated when a further longitudinal member 17 is used provided the attaching welds between the latter and the respective cross members are sufficiently strong to maintain the positional relationship of the members and the integrity of the overall protective insert 10.

Extending downwardly from the underside of the longitudinal connecting members 15, 16 are a plurality of prong-type attaching members 21 for securely attaching the protective insert 10 to the sewer grating 4. As will be discussed in more detail below, each attaching member may be force fitted downwardly past a respective wall divider 6 whereby an enlarged prong portion of the former extends beneath the lower edge of that wall divider to preclude withdrawal of the protective insert 10 from the sewer grating without the use of a strong prying tool.

Figure 2:
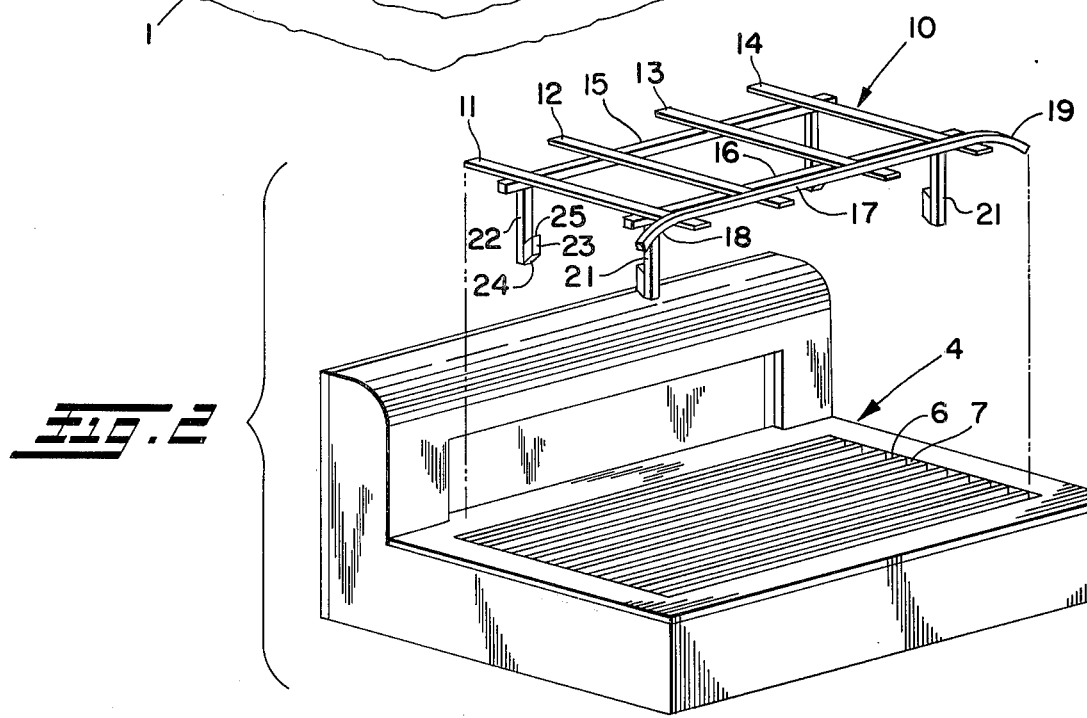
FIG. 2 is an exploded isometric view of the protective insert of the invention relative to a sewer grating.

Turning now more particularly to FIG. 2, the protective insert 10 is illustrated in position for attachment to the sewer grating 4. As described above, each of the cross members 11 through 14 is welded to the longitudinal members 15, 16, and the further longitudinal member 17 is welded proximate one of the ends of the cross members. The prong-type attaching members 21 are illustrated in detail, preferably having been cut from steel stock so as to comprise a downwardly extending shank member 22 and an enlarged hook or prong portion 23. At a lower, and, as shown, inwardly facing portion of each prong portion is a beveled surface 24, which facilitates insertion of the attaching members into position with respect to the sewer grating 4.

Each of the attaching members is substantially rigid; however, such members are capable of slight deformation to permit insertion into respective longitudinal openings 7 of the sewer grating 4. Thus, upon such insertion the beveled surfaces 24 facilitate sliding and deformation of the attaching members relative to respective wall dividers 6. As the protective insert 10 is further urged downward with respect to the sewer grating 4 the respective points 25 of the prong portions will eventually fall beneath the lower edges of the respective wall dividers and will then snap into position thereunder precluding withdrawal of the protective insert from the sewer grating without a strong prying tool.

Figure 3:
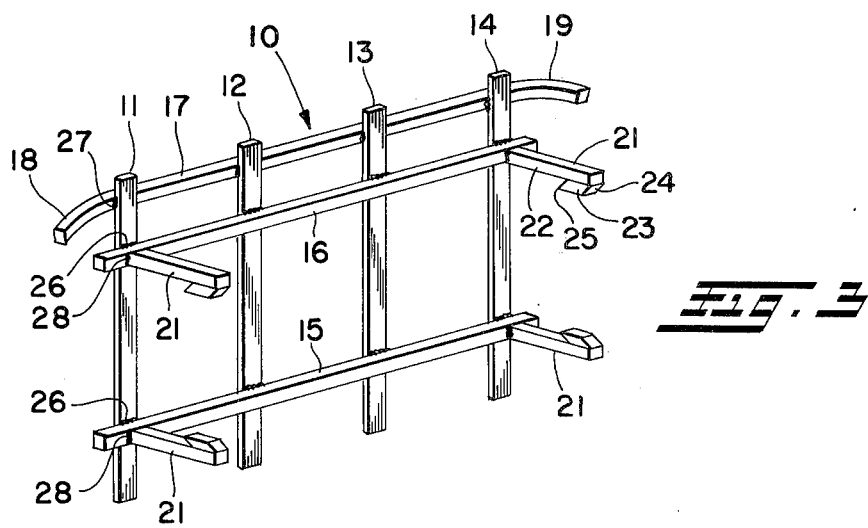
FIG. 3 is a perspective view of the protective insert of the invention.

The undersurface of the protective insert 10 is clearly seen in the perspective view illustrated in FIG. 3. In that figure the welds 26 between the cross members 11 through 14 and the respective longitudinal members 15, 16 as well as the welds 27 between the cross members and the further longitudinal member 17 are visible. Moreover, the welds 28 between the respective attaching members 21 and the longitudinal members also are illustrated.

Thus, it should now be understood that the protective insert 10 of the invention exhibits a low profile so as to be relatively inconspicuous both to sight and touch. The cross members 11 through 14 prevent narrow wheels or the like from wedging in the longitudinal openings 7 of the sewer grating 4, and the further longitudinal member prevents interference with snow plows or the like. Moreover, by virtue of the low profile, the protective insert 10 exhibits minimal interference with conventional street cleaning equipment, motor vehicles, or the like. Further, although the invention is illustrated and described with respect to application to a rectangular-shape sewer grating, the protective insert may readily be adapted to fit in circular shape or sewer gratings or the like having different configurations.

The embodiments of the invention in which an exclusive property or privilege is claimed are defined as follows:

1. A protective insert for sewer gratings, which include a plurality of substantially parallel interstitial wall dividers being substantially coplanar at the upper edges thereof and defining a plurality of longitudinal openings therebetween, comprising:

a plurality of cross members, said cross members being substantially coplanar and parallel with respect to each other for positioning in overlying relation on the upper edges of the wall dividers of such a sewer grating for support thereby;

means for connecting said cross members together in such substantially coplanar and parallel relation, said means for connecting including at least one longitudinal member positioned between said cross members, extending perpendicularly thereto, and adapted for positioning completely within one of said longitudinal openings; and means for attaching said insert to a sewer grating.

2. A protective insert for sewer gratings as set forth in claim 1, said means for connecting comprising at least two longitudinal members, each being positioned proximate respective opposed ends of said cross members.

3. A protective insert for sewer gratings as set forth in claim 1, further comprising means attached to said insert for preventing interference between the same and snow plows.

4. A protective insert for sewer gratings, which include a plurality of substantially parallel interstitial wall dividers being substantially coplanar at the upper edges thereof and defining a plurality of longitudinal openings therebetween, comprising:

a plurality of cross members, said cross members being substantially coplanar and parallel with respect to each other for positioning in overlying relation on the upper edges of the wall dividers of such a sewer grating for support thereby;

means for connecting said cross members together in such substantially coplanar and parallel relation, said means for connecting including at least two longitudinal members, each being positioned between said cross members, extending perpendicularly thereto and proximate respective opposed ends thereof, and adapted for positioning completely within one of said longitudinal openings; and means for attaching said insert to a sewer grating, said means for attaching comprising a plurality of substantially rigid downwardly extending prong members, each being coupled to said means for connecting, and each being adapted for force fitting through said longitudinal openings past respective wall dividers of the sewer grating, whereby enlarged prong portions of said prong members may be located beneath respective lower edges of wall dividers to preclude removal of said insert.

5. A protective insert for sewer gratings, which include a plurality of substantially parallel interstitial wall dividers being substantially coplanar at the upper edges thereof and defining a plurality of longitudinal openings therebetween, comprising:

a plurality of cross members, said cross members being substantially coplanar and parallel with respect to each other for positioning in overlying relation on the upper edges of the wall dividers of such a sewer grating for support thereby;

means for connecting said cross members together in such substantially coplanar and parallel relation, said means for connecting including at least one longitudinal member positioned between said cross members, extending perpendicularly thereto, and adapted for positioning completely within one of said longitudinal openings; and means for attaching said insert to a sewer grating, said means for attaching comprising a plurality of substantially rigid downwardly extending prong members, each being coupled to said means for connecting, and each being adapted for force fitting through said longitudinal openings past respective wall dividers of the sewer grating, whereby enlarged prong portions of said prong members may be located beneath respective lower edges of wall dividers to preclude removal of said insert.

6. A protective insert for sewer gratings, which include a plurality of substantially parallel interstitial wall dividers being substantially coplanar at the upper edges thereof and defining a plurality of longitudinal openings therebetween, comprising:

a plurality of cross members, said cross members being substantially coplanar and parallel with respect to each other for positioning in overlying relation on the upper edges of the wall dividers of such a sewer grating for support thereby;

means for connecting said cross members together in such substantially coplanar and parallel relation, said means for connecting including at least one longitudinal member positioned between said cross members, extending perpendicularly thereto, and adapted for positioning completely within one of said longitudinal openings;

means for attaching said insert to a sewer grating; and means attached to said insert for preventing interference between the same and snow plows, said means for preventing interference comprising a further longitudinal member attached to the upper surfaces of said cross members, said further longitudinal member having opposed ends and being positioned so as to extend substantially parallel to one of such longitudinal openings, said opposed ends being deformed in a downward direction whereby the remote portions thereof terminate beneath the plane of the upper edges of said wall dividers.

7. A protective insert for sewer gratings as set forth in claim 6, said means for connecting comprising at least two longitudinal members, each being positioned proximate respective opposed ends of said cross members.

8. A protective insert for sewer gratings as set forth in claim 7, said means for attaching comprising a plurality of substantially rigid downwardly extending prong members, each being adapted for force fitting through said longitudinal openings past respective wall dividers of the sewer grating, whereby enlarged prong portions of said prong members may be located beneath respective lower edges of wall dividers to preclude removal of said insert.

9. A protective insert for sewer gratings, which include a plurality of substantially parallel interstitial wall dividers being substantially coplanar at the upper edges thereof and defining a plurality of longitudinal openings therebetween, comprising:

a plurality of cross members, said cross members being substantially coplanar and parallel with respect to each other for positioning in overlying relation on the upper edges of the wall dividers of such a sewer grating for support thereby, and each of said cross members comprising flat metal stock so as to exhibit a low profile;

means for connecting said cross members together in such substantially coplanar and parallel relation, said means for connecting including at least one longitudinal member positioned between said cross members, extending perpendicularly thereto, and adapted for positioning completely within one of said longitudinal openings; and means for attaching said insert to a sewer grating.

10. A protective insert for sewer gratings, which include a plurality of substantially parallel interstitial wall dividers being substantially coplanar at the upper edges thereof and defining a plurality of longitudinal openings therebetween, comprising:
- a plurality of cross members, said cross members being substantially coplanar and parallel with respect to each other for positioning in overlying relation on the upper edges of the wall dividers of such a sewer grating for support thereby;
- means for connecting said cross members together in such substantially coplanar and parallel relation, said means for connecting including at least two longitudinal members, each being positioned between said cross members and extending perpendicularly thereto and proximate respective opposed ends thereof; and
- means for attaching said insert to a sewer grating, said means for attaching comprising a plurality of substantially rigid downwardly extending prong members, each being coupled to said means for connecting, and each being adapted for force fitting through said longitudinal openings past respective wall dividers of the sewer grating, whereby enlarged prong portions of said prong members may be located beneath respective lower edges of wall dividers to preclude removal of said insert.

11. A protective insert for sewer gratings as set forth in claim 10, at least one of said two longitudinal members having opposed ends and being positioned so as to extend substantially parallel to one of such longitudinal openings, said opposed ends being deformed in a downward direction whereby the remote portions thereof terminate beneath the plane of the upper edges of said wall dividers.

12. A protective insert for sewer gratings, which include a plurality of substantially parallel interstitial wall dividers being substantially coplanar at the upper edges thereof and defining a plurality of longitudinal openings therebetween, comprising:
- a plurality of cross members, said cross members being substantially coplanar and parallel with respect to each other for positioning in overlying relation on the upper edges of the wall dividers of such a sewer grating for support thereby;
- means for connecting said cross members together in such substantially coplanar and parallel relation, said means for connecting including at least one longitudinal member positioned between said cross members and extending perpendicularly thereto; and
- means for attaching said insert to a sewer grating, said means for attaching comprising a plurality of substantially rigid downwardly extending prong members, each being coupled to said means for connecting, and each being adapted for force fitting through said longitudinal openings past respective wall dividers of the sewer grating, whereby enlarged prong portions of said prong members may be located beneath respective lower edges of wall dividers to preclude removal of said insert.

13. A protective insert for sewer gratings, which include a plurality of substantially parallel interstitial wall dividers being substantially coplanar at the upper edges thereof and defining a plurality of longitudinal openings therebetween, comprising:
- a plurality of cross members, said cross members being substantially coplanar and parallel with respect to each other for positioning in overlying relation on the upper edges of the wall dividers of such a sewer grating for support thereby, and each of said cross members comprising flat metal stock so as to exhibit a low profile;
- means for connecting said cross members together in such substantially coplanar and parallel relation, said means for connecting including at least one longitudinal member positioned between said cross members and extending perpendicularly thereto; and
- means for attaching said insert to a sewer grating.

14. A protective insert for sewer gratings as set forth in claim 13, said at least one longitudinal member being attached to the upper surfaces of said cross members, and extending substantially parallel to one of such longitudinal openings, and having opposed ends deformed in a downward direction whereby the remote portions thereof terminate beneath the plane of the upper edges of said wall dividers.

* * * * *